Figure 3:
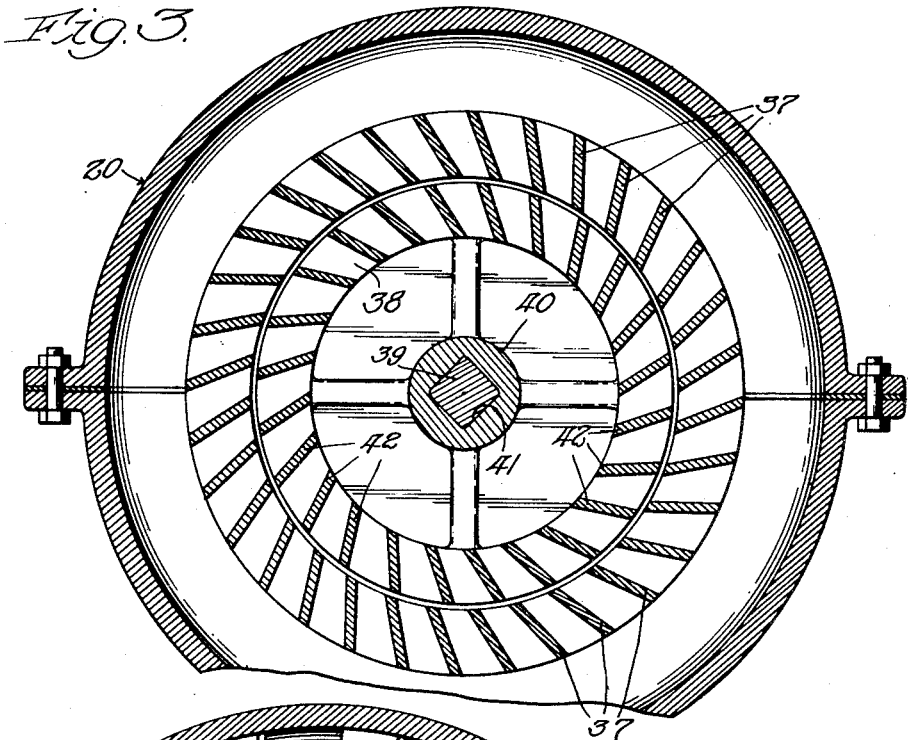

Dec. 12, 1950     L. L. CHIVILLE, JR     2,534,104
HYDRAULIC PLANETARY TRANSMISSION
Filed May 12, 1948     6 Sheets-Sheet 1
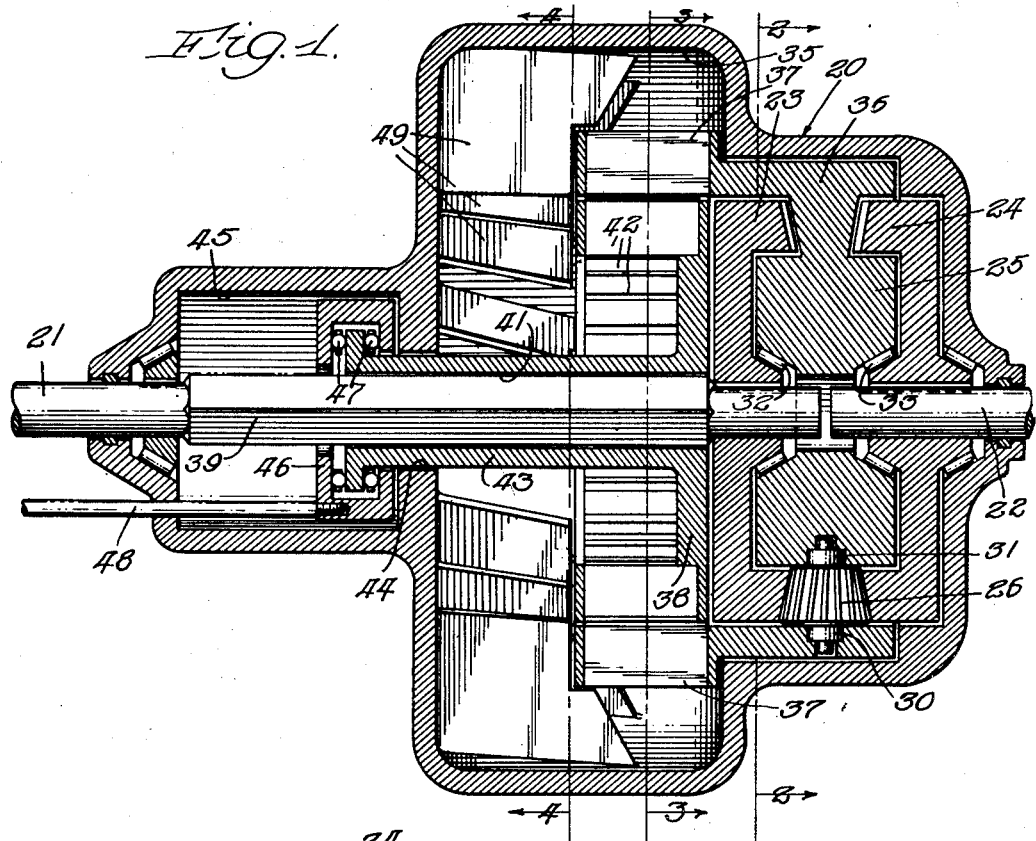
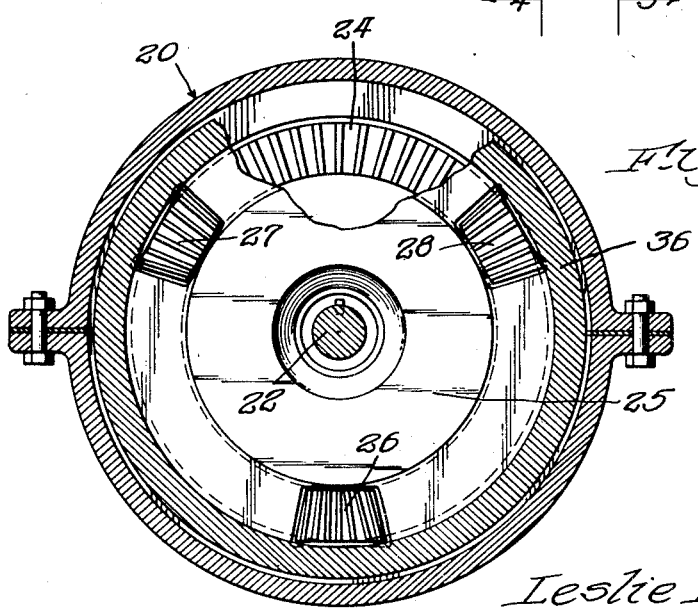
Inventor:
Leslie L. Chiville, Dec. 12, 1950     L. L. CHIVILLE, JR     2,534,104
HYDRAULIC PLANETARY TRANSMISSION Filed May 12, 1948     6 Sheets-Sheet 3

Inventor:
Leslie L. Chiville,
By Clinton, Schroeder,
Merriam, Holgren, Attys.

Dec. 12, 1950    L. L. CHIVILLE, JR    2,534,104
HYDRAULIC PLANETARY TRANSMISSION
Filed May 12, 1948    6 Sheets-Sheet 4
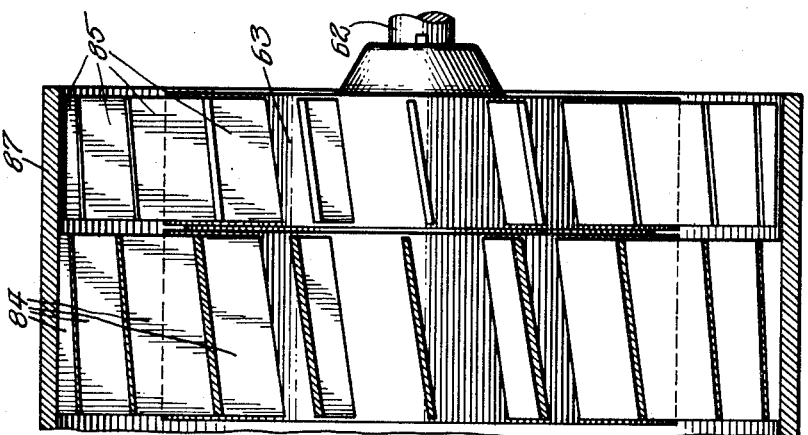
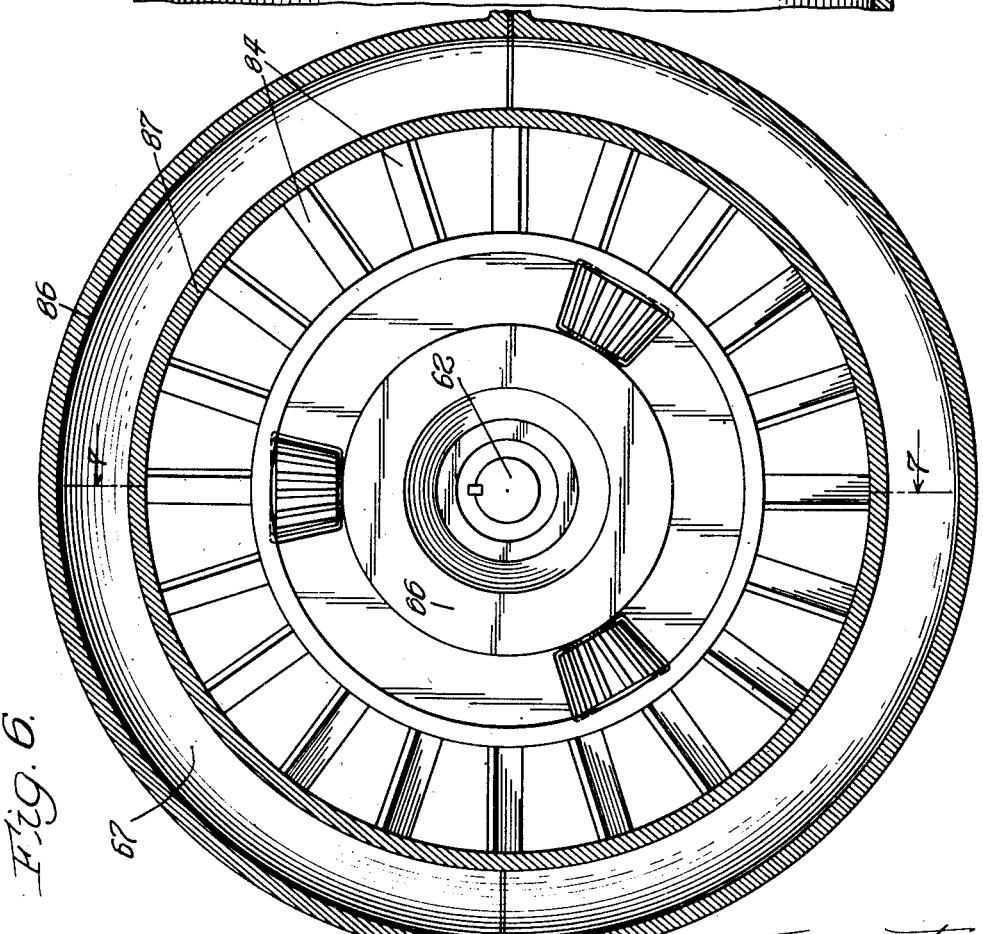

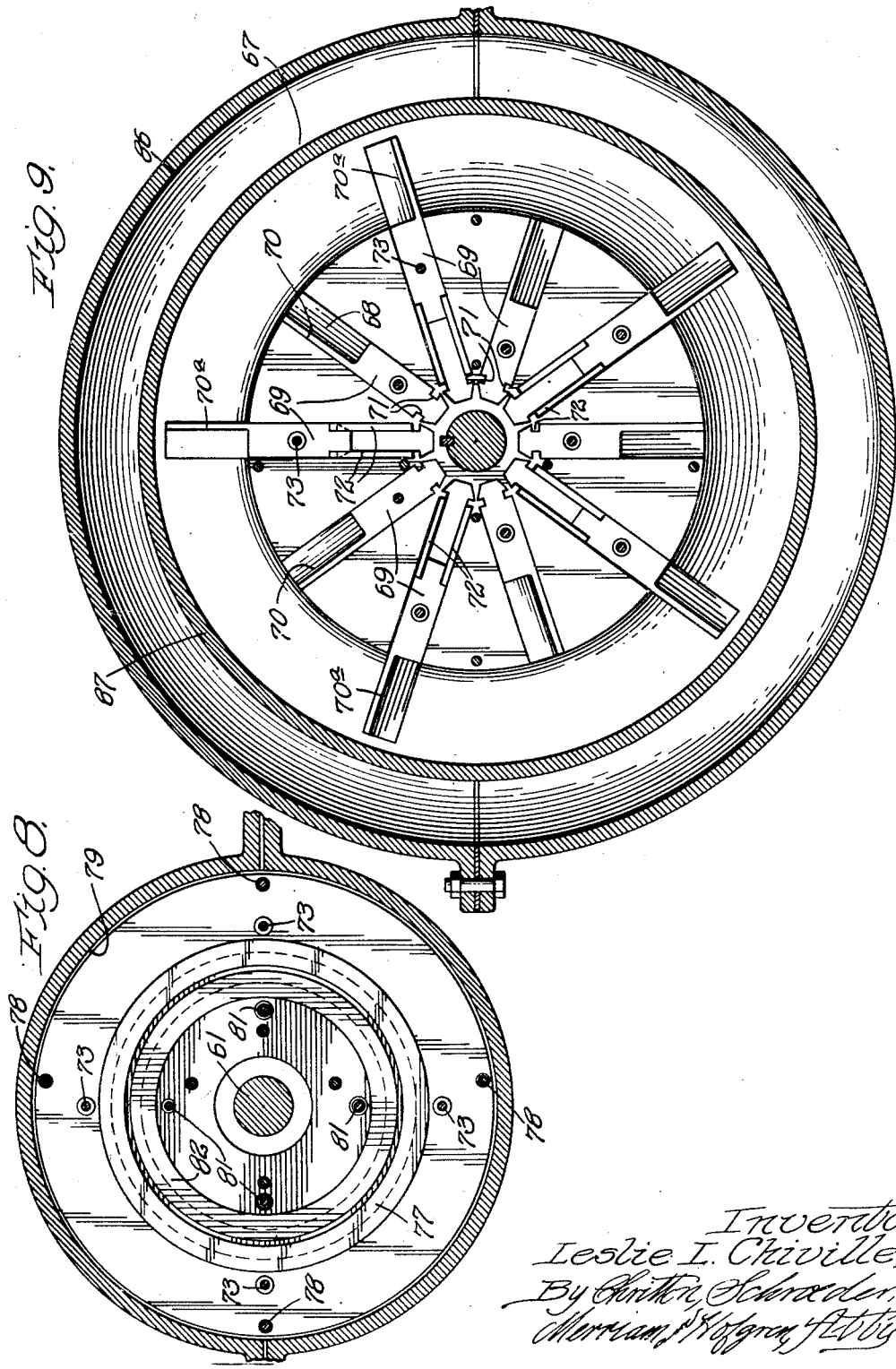

Dec. 12, 1950        L. L. CHIVILLE, JR        2,534,104
HYDRAULIC PLANETARY TRANSMISSION
Filed May 12, 1948        6 Sheets-Sheet 6
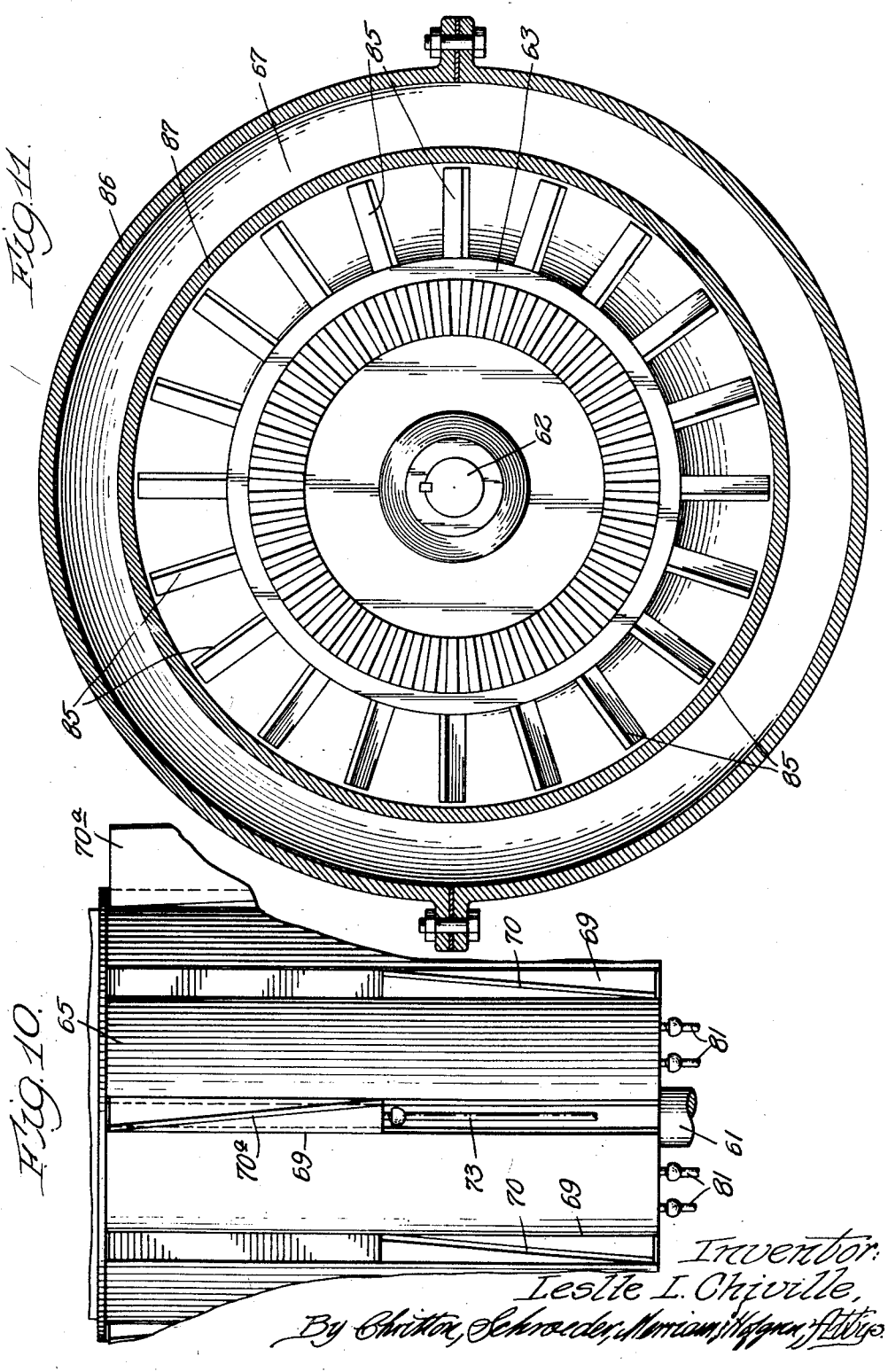

Patented Dec. 12, 1950

2,534,104

UNITED STATES PATENT OFFICE 2,534,104

HYDRAULIC PLANETARY TRANSMISSION

Leslie L. Chiville, Jr., Carpentersville, Ill.

Application May 12, 1948, Serial No. 26,590

13 Claims. (Cl. 74—688)

This invention relates to a transmission and more particularly to a hydraulic transmission of new and improved construction.

Hydraulic transmissions are becoming increasingly popular as a means of transmitting power from a prime mover to an object to be rotated thereby. Particularly, hydraulic transmissions' coming into favor for use with automobiles because of their ready adaptability to automatic control. Thus, for example, fluid transmissions are available in certain makes of present motor cars to provide an automatic gear shift.

The difficulty with such automatic gear shifts is that the transition from one gear to another, from low gear to second gear for example, is accompanied by a sudden lurch of the car due to the decreased ratio between the R. P. M. of the engine and that of the wheels. Accordingly it has been found desirable that a fluid clutch be interposed between the engine and transmission in order to dampen such sudden changes of speed as much as possible.

Other types of hydraulic transmissions have been suggested in which gears have been completely eliminated and power is transmitted to the wheels through hydraulic fluid only, the distribution of hydraulic fluid pressure to one or more hydraulic motors supplying the necessary reduction in speed ratio between the engine and wheels to provide the necessary torque in starting and under unusual load. Such all-fluid types of transmissions have not come into favor due perhaps in part to the fact that the entire power is transmitted through hydraulic fluid. The absence of gears therefore means the complete absence of positive power.

The all-fluid type transmission has, in some forms, the advantage of having an infinite number of speeds forward as contrasted with a limited and very definite number of speeds in the first mentioned type of transmission.

I have invented and am herein disclosing and claiming a hydraulic transmission having the desirable quality of transmitting power from the motor to the wheels through gears and hence through a positive drive means which yet possesses many of the desirable characteristics of the all-fluid transmission in that an infinite number of gear ratios are readily available. The transition from one ratio to another is smooth and even and not accompanied by a sudden surge of power. While the transmission is particularly adapted for use in a motor vehicle, my hydraulic transmission can be used with advantage in conjunction with any source of power such as an engine for transmitting that power to an object to be rotated at a number of ratios of engine speed to driven speeds either in forward or reverse.

Figure 4:
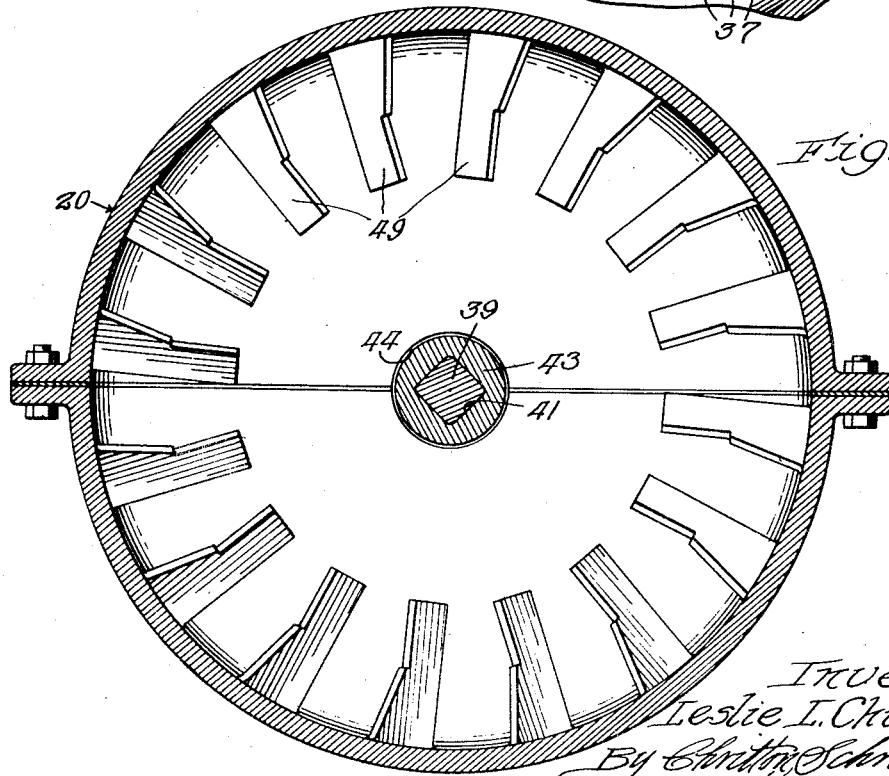
Figure 5:
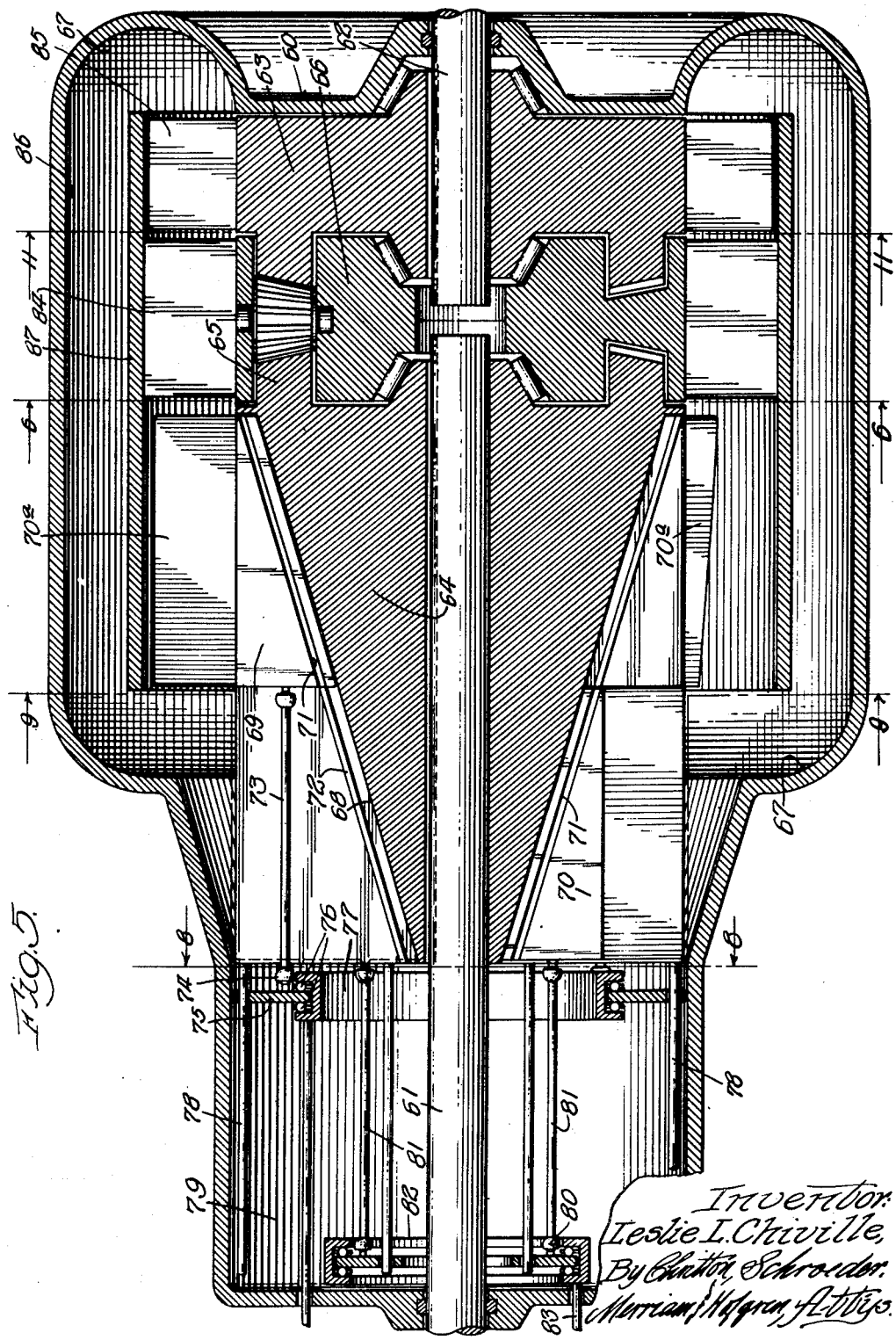

The invention will be described in conjunction with the embodiments shown in the accompanying drawings in which Fig. 1 is a sectional view through one form of my device; Fig. 2 is a section along line 2—2 of Fig. 1; Fig. 3 is a section along line 3—3 of Fig. 1 and Fig. 4 is a section along line 4—4 of Fig. 1. Fig. 5 is a view like Fig. 1 of a modified form of my invention; Fig. 6 is a section along line 6—6 of Fig. 5; Fig. 7 is a section along line 7—7 of Fig. 6; Fig. 8 is a section along 8—8 of Fig. 5; Fig. 9 is a section along 9—9 of Fig. 5; Fig. 10 is an enlarged elevational view of a portion of Fig. 5 between line 6—6 and 8—8 and Fig. 11 is a sectional view along line 11—11 of Fig. 5.

Referring now to the first form of the device shown in Figs. 1 to 4 inclusive I show a housing 20 in which is rotatably mounted a drive shaft 21 and a driven shaft 22. Secured to the drive shaft 21 is a drive gear 23 while a driven gear 24 is mounted on the driven shaft. A planetary gear system is interposed between said gears; the planetary gear system being, in the embodiment shown, the familiar type having a planet carrier 25 and three beveled planet gears 26, 27 and 28 rotatably mounted on bearings 30 and 31 in the planetary carrier with said gears engaging the drive gear and driven gear as shown. The planet carrier 25 is mounted on bearings 32 and 33 so as to be freely rotatable with respect to either the drive shaft 21 or the driven shaft 22. As illustrated, the planetary gear system completely fills the space between the drive gear and the driven gear in order that that space may be free of hydraulic fluid which fills a reservoir portion 35 in the housing 20. If desired, however, the planetary gear system may be constructed in the familiar form of a spider rather than of solid construction with the space between the arms of the spider being permitted to fill with fluid. Such fluid will not seriously detract from the operation of the device as hereinafter explained. It will also be clear from the discussion of the operation of the device to be found later in this specification that other types of planetary gear systems may be used in place of the one shown.

The planet carrier 25 is equipped with a vane carrying portion 36 extending beyond the beveled gears 26—28 and beyond the drive gear as shown. These portions 36 carry a plurality of inclined rotor vanes 37 which are arranged in the form of an annulus, that is, the vanes 37 lie about the rotor periphery of a circle lying in a plane parallel to the axis of rotation of the planetary gear system 25.

A fluid impeller 38 is fixed to the drive shaft 21 so as to be rotated thereby. The drive shaft is provided with a square portion 39 and the hub 40 of the impeller 38 is equipped with a square opening 41 slidably fitting on the portion 39 of the drive shaft. Thus, rotation of the drive shaft causes rotation of the impeller 38. The impeller 38 is provided with a plurality of vanes 42 which are inclined in the same direction as the rotor vanes 37, the angle of inclination being somewhat greater than those of the latter vanes. As best shown in Fig. 1 the hub portion 40 of the impeller is provided with an elongated sleeve 43 which extends through an opening 44 in the left hand portion of the housing 20 and into a chamber 45. A collar 46 is secured over the end of the sleeve 43 with relative rotation between the collar and sleeve being permitted by the bearings 47 interposed therebetween. A control rod 48 is fixed to the collar 46 and extends beyond the portion 45. Moving the control rod to the left or right causes the impeller 38 to move to the left or right on the drive shaft 21.

A plurality of stator blades 49 are secured to the left hand end (as seen in Fig. 1) of the reservoir 35. These blades are fixed to the reservoir, that is, are not mounted upon a rotatable member in contrast to the vanes 37 and 42. By means of the control rod 48 the impeller 38 may be moved to the position shown in Fig. 1 in which it is located within the vanes 37 attached to the rotor planet carrier, that is, wherein the impeller 38 is completely surrounded by the rotor vanes 37. From this position it may be moved to the left to a position wherein it is completely surrounded by the stator blades 49. The impeller 38 may of course be halted at any intermediate position between the two extremes just described.

In operation, the fluid reservoir 35 is maintained full of hydraulic fluid. The particular type of planetary gear system shown is adapted to rotate at half the speed of the drive gear when the transmission is in neutral to impart no rotation to the driven gear. Varying the speed of rotation of the planet carrier above and below half the speed of the drive gear will cause the driven gear to rotate in a forward or reverse direction and at variable speeds. Accordingly, with the transmission in the position shown in Fig. 1, hydraulic fluid within the reservoir is driven by the impeller 38 against the rotor vanes 37 carried by the planet carrier to cause the planet carrier to rotate at a speed greater than half the speed of the drive gear. In the particular position shown the planet carrier will be forced to rotate at approximately the same speed as the drive gear and therefore to rotate the driven gear in the same direction and at approximately the speed of the drive gear. Moving the impeller 38 to the left by means of the control rod 48 decreases the volume and force of hydraulic fluid propelled against the rotor vanes 37 with the result that the speed of rotation of the planet carrier relative to the drive gear will decrease to cause a corresponding decrease in the rate of rotation of the driven gear and driven shaft. When the impeller 38 is moved all of the way to the left, fluid propelled thereby will be directed outwardly against the stator blades 49 to the outer extremities of the reservoir from whence fluid will curve inwardly against the rotor vanes 37 on the planet carrier to cause the planet carrier to rotate at less than half the speed of the drive gear whereupon the driven shaft will be driven in a direction opposite to the direction of rotation of the drive shaft. By moving the impeller to a position intermediate to the two extremities just described fluid will be propelled against both the stator blades 49 and the rotor vanes 37 with equal force and thereby neutralize the effect of fluid propulsion on the planet carrier. In such intermediate position the planet carrier will rotate at half the speed of the drive gear and hence the transmission will be in a neutral position and impart no rotation to the driven gear.

The principle of operation of the embodiment shown in Figs. 5 to 11 inclusive is substantially the same as that previously described. Referring now to Fig. 5 the transmission is provided with a housing 60 carrying a rotatably mounted drive shaft 61 and a rotatably mounted driven shaft 62. A driven gear 63 is fixed to the driven shaft and a cylindrical element 64 is fixed to the drive shaft. The right hand end (as shown in Fig. 5) of the element 64 is provided with teeth to form a drive gear 65. A planetary gear system having a planet carrier 66 similar to the planet carrier 25 is operatively interposed between the drive and driven gears and operates in the same manner as the previously described planetary gear system. A housing is provided with a fluid reservoir portion 67 which, during operation of the transmission, is completely filled with hydraulic fluid.

The member 64 is provided with a plurality of grooves 68. As best seen in Fig. 9, the grooves 68 run substantially parallel to the drive shaft 61 and are inclined so as to have bottoms sloping to the left and inwardly toward the drive shaft. Slidably mounted in each groove 68 is a guide member 69 carrying a vane 70. As can be seen in Fig. 10 alternate vanes 70 are inclined in one direction while intermediate vanes 70a are inclined in the opposite direction. Each guide 69 is provided with a groove 71 along opposite sides, which grooves engage a tongue 72 provided along the bottom of the groove 68. A rod 73 is attached to each guide carrying a vane 70a with each of the rods 73 being attached by a universal joint 74 to a ring 75 rotatably mounted on bearings 76 on an annular member 77. The member 77 is slidable to the left and right (as viewed in Fig. 5) and is mounted for such sliding motion on guide rods 78 which are fixed to the member 64. Movement of the member 77 is effected by a control rod 79 which extends beyond the housing. Thus, it can be seen that movement of the member 77 to the left from the position shown in Fig. 5 serves to draw all members 69 carrying vanes 70a to the left. As the grooves 68 in which the members 69 are mounted slant inwardly to the left, all vanes 70a are drawn downwardly within the grooves 68 to a point where they are substantially even with the exterior surface of the element 64 and out of propelling contact with the fluid filling the reservoir. Similarly, the vanes 70 may be moved from the position shown, wherein they are enclosed within the member 64, to a fluid propelling position. That is, they may be moved from the position shown to the right, to the position occupied by the vanes 70a.

Accordingly each member 69 carrying a vane 70 is attached to a ring 80 by means of a rod 81. The ring 80 is rotatably mounted in a member 82 by means of bearings which member 82 may be moved to the left and the right by control rod 83. As can be seen in Fig. 10 the vanes 70 and 70a are inclined in opposite directions so as to propel fluid within the reservoir 67 to the right or left, depending upon which of the two sets of vanes is elevated above the member 64.

With the transmission in the position shown, the vanes 70a are in propelling contact with the fluid and rotation of the member 64 in a clockwise direction, as viewed in Fig. 9, will cause fluid within the reservoir to move to the right directly against rotor vanes 84 carried by the planet carrier 66. The fluid will continue to the right from the rotor vanes 84 to the rotor vanes 85 carried by the driven gear 63 and thence into a passage 86 within the reservoir which is separated from the main portion of the reservoir by a cylindrical member 87 mounted on the ends of the vanes 84 of the planet carrier. Hydraulic fluid is thereby returned to the left hand end of the impeller vanes 70a along a passage out of contact with either of the rotor vanes just described.

With the transmission operating in the manner just described the driven gear will be driven in the same direction and at approximately the same speed as the drive gear. To reverse the direction of rotation of the driven gear, control rod 79 is moved to the left drawing the vanes 70a to the left and inwardly to a position within the groove 68. Thereupon by moving control rod 83 to the right and elevating the vanes 70 into propelling contact with the fluid, fluid will be driven thereby into the passage 86 and from thence against the rotor vanes 85 and 84. With fluid circulating in this direction the rotation of the planet carrier will be slowed to a point below half the speed of rotation of the drive gear and thus the driven gear will rotate in a direction opposite to that of the drive gear. With both pluralities of vanes 70 and 70a moved to the left to their fully retracted position, rotation of the member 64 will not circulate fluid within the reservoir. With the vanes in their retracted position the transmission will be in neutral and the planet carrier will rotate at half the speed of the drive gear.

The rotor vanes 85 are provided on the driven gear only to increase the efficiency of the transmission. They do not function as part of the control of the transmission and may obviously be omitted if desired. However, I have found that all of the energy supplied to the fluid within the reservoir is not completely utilized or absorbed by the vanes on the planet carrier and such excess energy may be supplied to the driven gear by providing the rotor vanes 85 in the manner shown.

In the two embodiments shown it is clear that I have provided a hydraulic transmission which is capable of providing an infinite number of speeds both in the forward and in the reverse direction. Transition between speeds, that is a transition between one ratio of rotation between the drive gear and the driven gear and another ratio is effected smoothly and without undue surges of power to the driven shaft. The transmission occupies but little space and is simply and economically manufactured.

While I have shown and described certain embodiments of my invention it is to be understood that it is capable of many modifications. Changes therefore in the construction and arrangement may be made without departing from the spirit and scope of the invention as disclosed in the appended claims.

I claim:

1. A hydraulic transmission, comprising: a drive shaft, a driven shaft, and a planetary gear system operatively interposed between said shafts, said planetary gear system having a drive gear rotated by the drive shaft, a driven gear adapted to rotate the driven shaft, a planet carrier and a plurality of planet gears on the carrier and meshing with said drive and driven gears to transmit rotation of the drive shaft to the driven shaft with the speed and direction of rotation of the planet carrier relative to the driven gear determining the speed and direction of rotation of the driven shaft, a fluid reservoir, a fluid impeller in the reservoir and driven by the drive shaft, a rotor in the reservoir and connected to the planet carrier and driven by the impeller, and control means for controlling the operation of the impeller to vary the velocity and direction of flow through the reservoir of the fluid propelled by the impeller.

2. A hydraulic transmission, comprising: a drive shaft, a driven shaft, a drive gear rotated by the drive shaft and a driven gear adapted to rotate the driven shaft, a planet carrier, and a plurality of rotatably mounted planet gears on the carrier and operatively connected to said drive and driven gears to transmit rotation of the drive shaft to the driven shaft with the speed and direction of rotation of the planet carrier relative to the drive shaft determining the speed and direction of rotation of the driven shaft, a torque converter interposed between the shafts, said converter including a fluid reservoir, an impeller in the reservoir having a plurality of vanes and driven by the drive shaft to propel fluid through the reservoir and a rotor in the reservoir having a plurality of vanes and connected to the planet carrier, and means for moving one of said pluralities of vanes to a first position in which fluid is propelled against one side of the rotor vanes to urge the planet carrier toward rotation in one direction relative to the drive gear, and means for moving said last mentioned plurality of vanes to a second position in which fluid is propelled against the opposite side of the rotor vanes to urge the planet carrier toward rotation in the other direction relative to the drive gear.

3. A hydraulic transmission, comprising: a drive shaft, a driven shaft, and a planetary gear system operatively interposed between said shafts, said planetary gear system having a drive gear on the drive shaft, a driven gear on the driven shaft, a planet carrier and a plurality of planet gears on the carrier and meshing with said drive and driven gears to transmit rotation of the drive shaft to the driven shaft, a fluid reservoir, a rotor in the reservoir and connected to the planet carrier, a fluid impeller in the reservoir and driven by the drive shaft, said impeller being adapted to propel fluid against the rotor, and control means for controlling the operation of the impeller to vary the velocity and direction of flow through the reservoir of the fluid propelled by the impeller.

4. A hydraulic transmission, comprising: a housing, a drive shaft and a driven shaft rotatably mounted in the housing, a planetary gear system operatively interposed between said shafts, said planetary gear system including a drive gear on the drive shaft and a driven gear on the driven shaft, a planet carrier, and a plurality of planet gears on the carrier meshing with said drive and driven gears with the speed and direction of rotation of the planet carrier relative to the drive gear determining the speed and direction of rotation of the driven shaft, a fluid reservoir in the housing, a rotor within the reservoir and connected to the planet carrier, said rotor having a plurality of inclined vanes, an impeller on the drive shaft and within the reservoir having a plurality of movable vanes, and control means for moving the impeller vanes to a first position in which said impeller vanes propel fluid in the reservoir in one direction and against one side of said inclined vanes to urge the planet carrier toward rotation in one direction, and said control means being adapted to move the vanes of the impeller to a second position in which said movable vanes propel fluid through the reservoir in the reverse direction and against the other side of the inclined vanes to urge the planet carrier toward rotation in the opposite direction.

5. The hydraulic transmission of claim 1 in which said impeller and said rotor are spaced apart within said reservoir, a fluid passage in said housing connecting opposite ends of said space with the intermediate portion of said passage being separated from said space and said control means operating to cause said impeller selectively to propel hydraulic fluid directly against the rotor across said space and to propel fluid through said passage and against the opposite side of the rotor.

6. A hydraulic transmission comprising a housing, a drive shaft and a driven shaft rotatably mounted in the housing, a drive gear on the drive shaft and a driven gear connected to the driven shaft, a planet carrier, a plurality of rotatably mounted planet gears on the carrier and operatively engaging said drive gear and said driven gear, a fluid reservoir in the housing, a fluid rotor within the reservoir and connected to the planet carrier, an impeller within the reservoir and driven by the drive shaft and control means for the impeller and operable to cause the impeller to propel hydraulic fluid through said reservoir in a first direction to urge the rotor towards rotation in one direction, and said control means being operable to cause the impeller to propel hydraulic fluid through said reservoir in the opposite direction to urge the rotor towards rotation in the opposite direction, said rotor and the impeller comprising annuli of inclined vanes and including an annulus of stator blades in the reservoir and fixed to the housing, said impeller being mounted on the drive shaft and slidable longitudinally thereof, said control means operating to slide the impeller to a first position wherein it is surrounded by the vanes of the rotor to urge said rotor in said first direction and said control means operating to slide said impeller to a second position wherein it is surrounded by the stator blades to urge the rotor toward rotation in said second direction.

7. A hydraulic transmission comprising a housing, a drive shaft and a driven shaft rotatably mounted in the housing, a drive gear on the drive shaft and a driven gear connected to the driven shaft, a planet carrier, a plurality of rotatably mounted planet gears on the carrier and operatively engaging said drive and driven gears, a fluid reservoir in the housing, a fluid rotor member within the reservoir and connected to the planet carrier, an impeller member within the reservoir driven by the drive shaft and adapted to propel fluid through the reservoir and against the rotor to control the speed and direction of rotation of the planet carrier relative to the drive gear, one of said members being movable to a first position in which fluid propelled by the impeller and against the rotor vanes urges the planet carrier toward rotation in one direction relative to the drive gear and said last mentioned member being movable to a second position in which fluid propelled by the impeller and against the rotor vanes urges the planet carrier toward rotation in the opposite direction relative to the drive gear, and means for moving the movable member to said first and second positions.

8. The hydraulic transmission of claim 7 in which said rotor is an annulus of vanes inclined away from the axis of rotation of the drive shaft and in which said impeller comprises a cylindrical member fixed to the drive shaft within the reservoir, a first plurality of vanes mounted on the member with all said vanes being inclined away from the axis of rotation of the drive shaft in one direction, a second plurality of vanes mounted on the member with all said last mentioned vanes being inclined away from the axis of rotation of the drive shaft in the other direction and said control means is operable to move either of said pluralities of vanes into propelling contact with the fluid in the reservoir.

9. A hydraulic transmission comprising a housing, a drive shaft and a driven shaft rotatably mounted in the housing, a drive gear on the drive shaft and a driven gear on the driven shaft, a planet carrier rotatably mounted in the housing, a plurality of rotatably mounted planet gears on the carrier and engaging said drive and driven gears with the speed and direction of rotation of the planet carrier relative to the drive gear determining the speed and direction of rotation of the driven gear, a fluid reservoir in the housing, a rotor within the reservoir and connected to the planet carrier, said rotor having a plurality of inclined vanes arranged about the periphery of a circle lying in a plane parallel to the axis of rotation of the planet carrier, an impeller on the drive shaft and within the reservoir said impeller having a plurality of vanes arranged about the periphery of a circle lying in a plane parallel to the first plane and control means for the impeller selectively operable to vary the volume and direction of fluid propelled against the rotor by the impeller.

10. The hydraulic transmission of claim 9 including a plurality of stator blades in the reservoir arranged about the periphery of a circle lying in a plane parallel to said planes, said second circle having a diameter less than the first and third circles and the impeller being slidable longitudinally of the drive shaft from a position within the first circle of vanes to a position within the third circle of vanes, said control means being operable to move said impeller to said positions.

11. The hydraulic transmission of claim 9 in which said rotor is located on one side of the reservoir and said stator blades are located on the other side of the reservoir.

12. A hydraulic transmission comprising a housing, a drive shaft and a driven shaft rotatably mounted in the housing, a drive gear on the drive shaft and a driven gear on the driven shaft, a planet carrier rotatably mounted in the housing, a plurality of rotatably mounted planet gears on the carrier operatively interposed between and engaging said gears with the speed and direction of rotation of the carrier relative to the drive shaft determining the speed and direction of rotation of the driven shaft, a fluid reservoir in the housing, a first plurality of vanes within the reservoir and attached to the carrier, an annular member fixed to the drive shaft within the reservoir, a first plurality of vanes mounted on the member, said vanes being inclined away from the axis of rotation of the drive shaft in one direction, a second plurality of vanes mounted on the member with all said last mentioned vanes being inclined away from the axis of rotation of the drive shaft in the other direction and control means adapted to move either of said plurality of vanes into propelling contact with the fluid in the reservoir.

13. The hydraulic transmission of claim 11 in which each of said vanes on the annular member is slidably mounted in an inclined groove therein, said control means being adapted to slide each of said plurality of vanes in said grooves to bring said vanes into propelling contact with the fluid.

LESLIE L. CHIVILLE, Jr.

REFERENCES CITED

The following references are of record in the file of this patent:

UNITED STATES PATENTS

| Number | Name | Date |
|---|---|---|
| 1,473,487 | McCarthy | Nov. 16, 1923 |
| 1,942,281 | Fraser | Jan. 2, 1934 |
| 2,157,230 | Cotterman | May 9, 1939 |
| 2,270,515 | Dodge | Jan. 20, 1942 |
| 2,283,486 | Berry | May 19, 1942 |
| 2,292,482 | Roche | Aug. 11, 1942 |
| 2,398,665 | Pietsch | Apr. 16, 1946 |

FOREIGN PATENTS

| Number | Country | Date |
|---|---|---|
| 104,761 | Australia | Aug. 9, 1938 |